US007896376B2

(12) United States Patent
Dauw et al.

(10) Patent No.: US 7,896,376 B2
(45) Date of Patent: Mar. 1, 2011

(54) WHEELCHAIR

(75) Inventors: Dirk Dauw, Vinzel (CH); Rainer Küschall, Basel (CH); Simon Watterton, Hofstetten (CH); Erich Glanzmann, Ettingen (CH); Thomas Markus Kohler, Münchenstein (CH); Romain de Jonckheere, Parcay-Meslay (FR)

(73) Assignee: Invacare Corporatopm, Elyria, OH (US)

( * ) Notice: Subject to any disclaimer, the term of this patent is extended or adjusted under 35 U.S.C. 154(b) by 674 days.

(21) Appl. No.: 11/645,479

(22) Filed: Dec. 26, 2006

(65) Prior Publication Data

US 2008/0067777 A1 Mar. 20, 2008

(30) Foreign Application Priority Data

Sep. 18, 2006 (EP) .................................... 06405395

(51) Int. Cl.
*B62M 1/14* (2006.01)

(52) U.S. Cl. ................................ 280/250.1; 297/DIG. 4

(58) Field of Classification Search ............... 280/250.1; 297/DIG. 4

See application file for complete search history.

(56) References Cited

U.S. PATENT DOCUMENTS

| | | | | |
|---|---|---|---|---|
| 1,952,467 A * | 3/1934 | Slee | 280/23.1 |
| 4,641,848 A * | 2/1987 | Ayers | 280/250.1 |
| 4,887,826 A * | 12/1989 | Kantner | 280/250.1 |
| 5,301,964 A * | 4/1994 | Papac | 280/250.1 |
| D365,788 S * | 1/1996 | Peterson | D12/131 |
| 5,480,179 A * | 1/1996 | Peacock | 280/650 |
| 5,727,802 A * | 3/1998 | Garven et al. | 280/250.1 |
| 5,727,809 A * | 3/1998 | Ordelman et al. | 280/650 |
| 5,855,387 A * | 1/1999 | Gill et al. | 280/283 |
| 6,311,999 B1 * | 11/2001 | Kueschall | 280/250.1 |
| 6,419,253 B1 * | 7/2002 | Mascari | 280/250.1 |
| 6,464,243 B2 * | 10/2002 | Roche | 280/650 |
| 6,979,010 B1 * | 12/2005 | Kwapis | 280/250.1 |
| 7,008,015 B2 * | 3/2006 | Bischoff | 297/216.1 |
| 7,243,935 B2 * | 7/2007 | Beumer | 280/250.1 |

FOREIGN PATENT DOCUMENTS

| | | |
|---|---|---|
| BE | 529233 | 6/1954 |
| DE | 29705494 | 5/1997 |
| DE | 29901471 | 7/1999 |
| NL | 9700001 | 5/1997 |
| WO | WO 03045299 A1 * | 6/2003 |

OTHER PUBLICATIONS

Communication forwarding extended Search Report from European Application No. 06405395 dated Mar. 2, 2007, 6 pgs.

* cited by examiner

*Primary Examiner* — Lesley Morris
*Assistant Examiner* — Daniel Yeagley
(74) *Attorney, Agent, or Firm* — Calfee, Halter & Griswold LLP

(57) ABSTRACT

The wheelchair comprises a seat and two main wheels connected by an axle. A support device, comprising an exchangeable intermediate element consisting of an elastomer element located in the lacuna provided by the spiral turns of a spring, is detachably fixed at one of its end to a chassis of the seat and at its other end to the axle through a center part attached to the middle part of the axle. The center part is arranged to receive the rear ends of the two left and right main frame tubes of the wheelchair.

22 Claims, 18 Drawing Sheets

WHEELCHAIR

CROSS-REFERENCE TO RELATED APPLICATIONS

This application claims the benefit of European Patent Application Number 06405395.2, filed Sep. 18, 2006, the contents of which are fully incorporated herein by reference.

TECHNICAL FIELD

The present invention relates to a wheelchair and to a support device for supporting a seat on an axle of a wheelchair.

BACKGROUND

U.S. Pat. No. 6,168,178 describes a wheelchair in which the chassis of the wheelchair can be converted from a rigid chassis to a suspension chassis and vice versa. However, the conversion is quite labour-intensive and complex as it implies the removal or addition of several components. Furthermore, the device disclosed in this reference does not allow to adjust further parameters of the wheelchair, such as seat height. Furthermore, mechanical forces are disadvantageously distributed in this device.

SUMMARY

The present invention seeks to improve comfort for wheelchair users and in particular to solve the problem of shock loads transmission into the spinal and skeleton parts of the human body. Furthermore, the present invention seeks to provide devices and components for wheelchairs that take individual preferences of a wheelchair user into account. An objective is thus to provide a wheelchair or wheelchair components that permit easy adaptations to the surface on which said wheelchair is intended to roll or to other varying circumstances. In particular, it is an objective of providing components for a wheelchair, which can easily be replaced according to the wheelchair user's needs, preferably by the wheelchair user alone.

Accordingly, it is an objective of the present invention to provide means for adjusting the height of the seat surface of a wheelchair. It is also an objective to provide for the possibility of adjusting the shock absorbing and springing characteristics of a wheelchair. The latter may be important to adapt the wheelchair according to the weight of the user, according to the surface on which the wheelchair is rolling and also to individual preferences of the user.

In general, the present invention relates to non-motorized wheelchairs. Such wheelchairs are generally hand driven and are advantageously light in weight. It is thus a further objective to provide a wheelchair that is optimised in terms of material utilisation and provides for high stability at relatively low weight.

The present invention relates to a wheelchair comprising a seat with a rear part and a front part, two left and right main wheels, connected by a transversal axle, and left and right lateral frame elements, wherein said seat is supported at its rear part on said transversal axle and at its front part on said lateral frame elements, respectively, at a left side and a right side of the front part of the seat, and wherein said lateral frame elements converge towards the rear part of the seat.

In another aspect, the present invention relates to a support device for supporting a seat on an axle of a wheelchair, comprising an exchangeable intermediate element detachably fixed at one of its ends to a chassis of the seat and at its other end to the axle and wherein the intermediate element can be selected according to preferences of a user of the wheelchair.

In a further aspect, the present invention provides a wheelchair comprising a seat and two main wheels connected by an axle and further comprising a support device according to the invention, wherein said support device is detachably fixed at one of its end to a chassis of the seat and at its other end to the axle through a center part attached to the middle part of said axle, said center part being arranged to receive the rear ends of two left and right main frame elements of the wheelchair.

In yet another aspect, the present invention provides a support structure for connecting an axle of a wheelchair to a chassis of a seat of the wheelchair, said support structure comprising a support device according to the invention and a center part attached to the middle of the axle, said center part being arranged to receive the rear ends of two left and right main frame elements of the wheelchair.

The term "frame element", in the context of the present invention, refers to oblong, longish structures capable of assuming a support function, such as, for example, tubes, struts, bars, rods, and the like. In other words, the cross-section and the material constitution of the frame element is not relevant, as long as the support function can be accomplished.

DRAWINGS

These and other features, aspects, and advantages of the present invention will become better understood with regard to the accompanying drawings, following description, and appended claims.

DESCRIPTION

Various embodiments according to the present invention will be now described by way of example with reference to the appended drawing figures.

Figure 1:
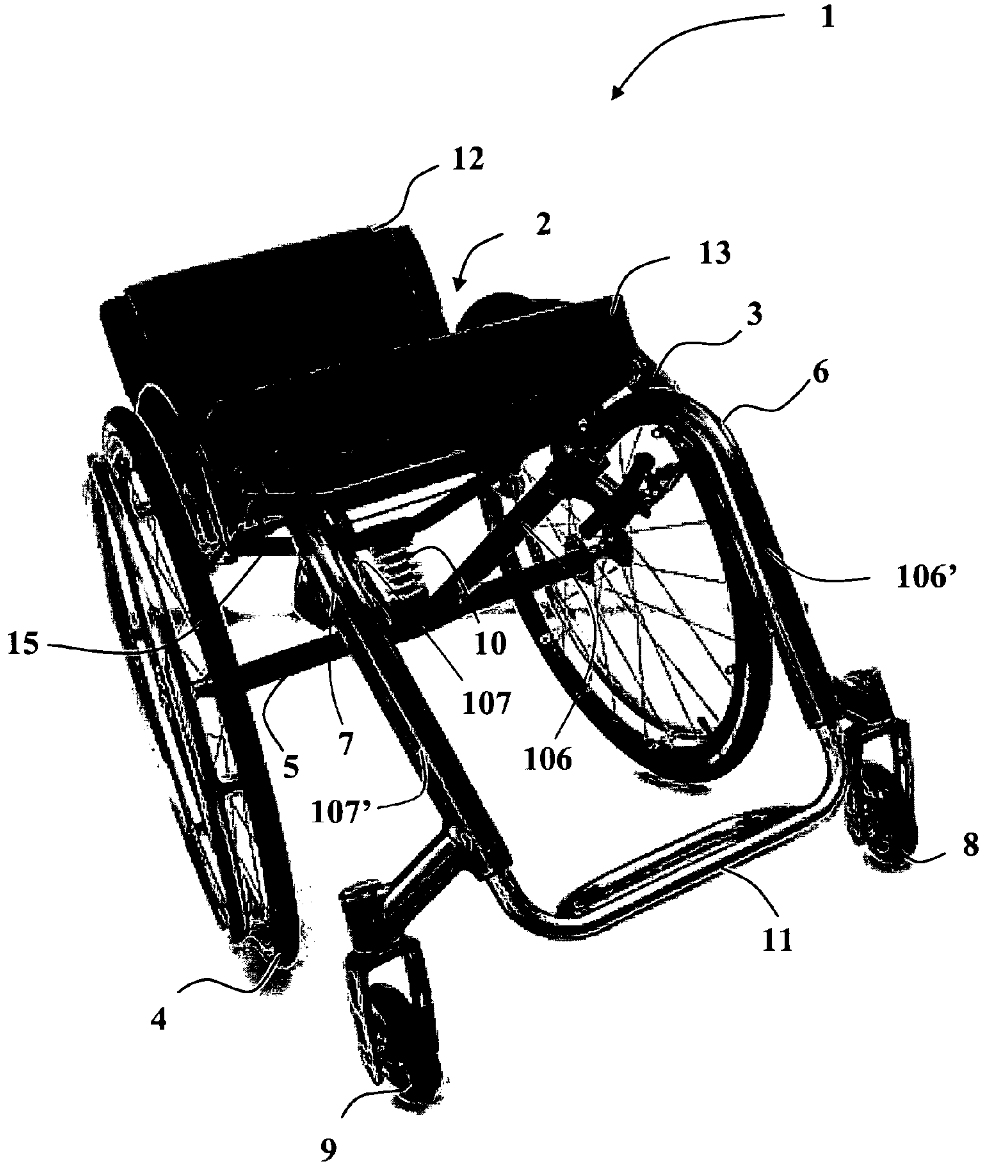
FIG. 1 shows a three quarter bottom front view of the wheelchair of the present invention comprising a first embodiment of the support device of the invention.

FIG. 1 shows a wheelchair 1 according to the present invention. The wheelchair is hand-driven. As usual in wheelchairs, there is a seat 2 for accommodating a wheelchair user, said seat comprising a seat surface 13 and a backrest 12. The perspective of a user seated in the wheelchair defines the left, right, front and rear sides of the wheelchair. Given that FIG. 1 represents a front view, the right side of FIG. 1 corresponds to the left side of the wheelchair and vice versa. Left and right main wheels 3, 4, are connected at their central points by a transversal axle 5. The wheels are equipped with parallel-grip-rings for manual propulsion. Left and right frame tubes 6, 7, emerge from below the seat towards left and right front sides of the wheelchair.

The frame tubes 6, 7 are bent, with a rear section 106, 107 of each frame tube 6, 7, respectively, being defined as the section extending from the bend to the rear ends of the frame tubes 6, 7, and with a front section 106', 107' of each frame tube 6, 7, being defined as the section extending from the bend to the front ends of the frame tube, 6, 7, respectively. The front ends of the frame tubes 6, 7 extend downwardly in the front part of the wheelchair.

While each left and right frame tubes 6, 7, is preferably provided as a single-pieced, bent tube, with the bend defining rear and front sections 106, 106', and 107, 107', respectively, of each frame tube, it is of course possible to provide rear and front sections of each frame tube as two or even more part pieces, which are attached to each other, be it rigidly, by welding, for example, or adjustably. For example, according to a variant, the front section 106', 107' of each left and right frame tube could be pivotally connected to the respective rear section 106, 107, the latter thus being a separate piece. This may provide further possibilities of adjustment.

Laterally at said front sections 106', 107', towards their bottom ends, support structures for lodging left and right castor wheels 8, 9, respectively, are attached, for example, by welding, to each left and right frame tube 6, 7. A U-shaped foot-rest 11 connects the left and right frame tubes 6, 7 at their bottom ends. The outer tube circumference of the foot-rest 11 is equal or slightly smaller than the inner circumference of the front sections 106', 107' of the left and right main frame tubes at their bottom ends. In this way, the left and right lateral parts of the foot-rest 11 telescopically slide within the front sections 106', 107' of the left and right frame tubes 6, 7, the latter being arranged in parallel at their bottom ends. A number of holes present in the left and right tubes of the U-shaped foot-rest allows for adjustment of foot-rest height, by tightening a screw extending from borings in the front sections 106', 107' of left and right frame tubes, 6, 7, respectively, through said holes in the left and right lateral tubes of the foot rest.

As is also visible in FIG. 1, the rear sections 106 and 107 of the left and right frame tubes, 6, 7, converge towards their rear ends, where they are fixed to axle 5 of the wheelchair 1. In a position which lies in between the rear ends of the rear sections 106, 107, in the mid-point of axle 5, a support device 10 comprising a spring can be seen. At its upper end, said spring is linked to a tube 15, which is part of the seat chassis 14, namely of the rear part of said chassis.

From FIG. 1, the important role of the two frame tubes 6, 7 can be recognized, as these tubes provide, along with the horizontal, transversal axle 5, the overall framework of the wheelchair. As indicated, both left and right frame tubes are attached with their rear sections 106, 107 to the left and the right side of the middle point of the axle 5, leaving the middle zone of the axle 5 for bearing the support device. From their rear ends, the frame tubes extend forwardly and slightly upwardly, diverging towards the lateral left and right front ends of the seat, where they bend downwardly. Shortly before bending downwards, towards the front end of the rear sections 106, 107 of the frame tubes each left and right frame tube, 6, 7, is attached to the chassis of the seat of the wheelchair, namely to left and right seat tubes, respectively. As can be discerned in FIG. 1, the front sections 106', 107' of the lateral frame tubes also converge towards their respective bottom ends, albeit to a less extent than their rear counterparts 106, 107. This converging, non-parallel disposition of the front sections 106', 107' has the advantage that lateral space for the castor wheels 8, 9 is provided, so that the lateral dimension of the wheelchair 1 does not substantially vary from rear to front.

Accordingly, the seat 2, in FIG. 1, is supported at three positions, namely at a central position, substantially vertically above the axle 5, by the support device 10, and at two lateral positions, near the front of the upper parts of the frames tubes 6, 7, respectively, corresponding to the left and right sides towards the front of the seat. The unusual arrangement of the left and right frame tubes, being attached with their rear ends close to the middle point of the axle 5, reminds of legs of a spider.

Figure 2:
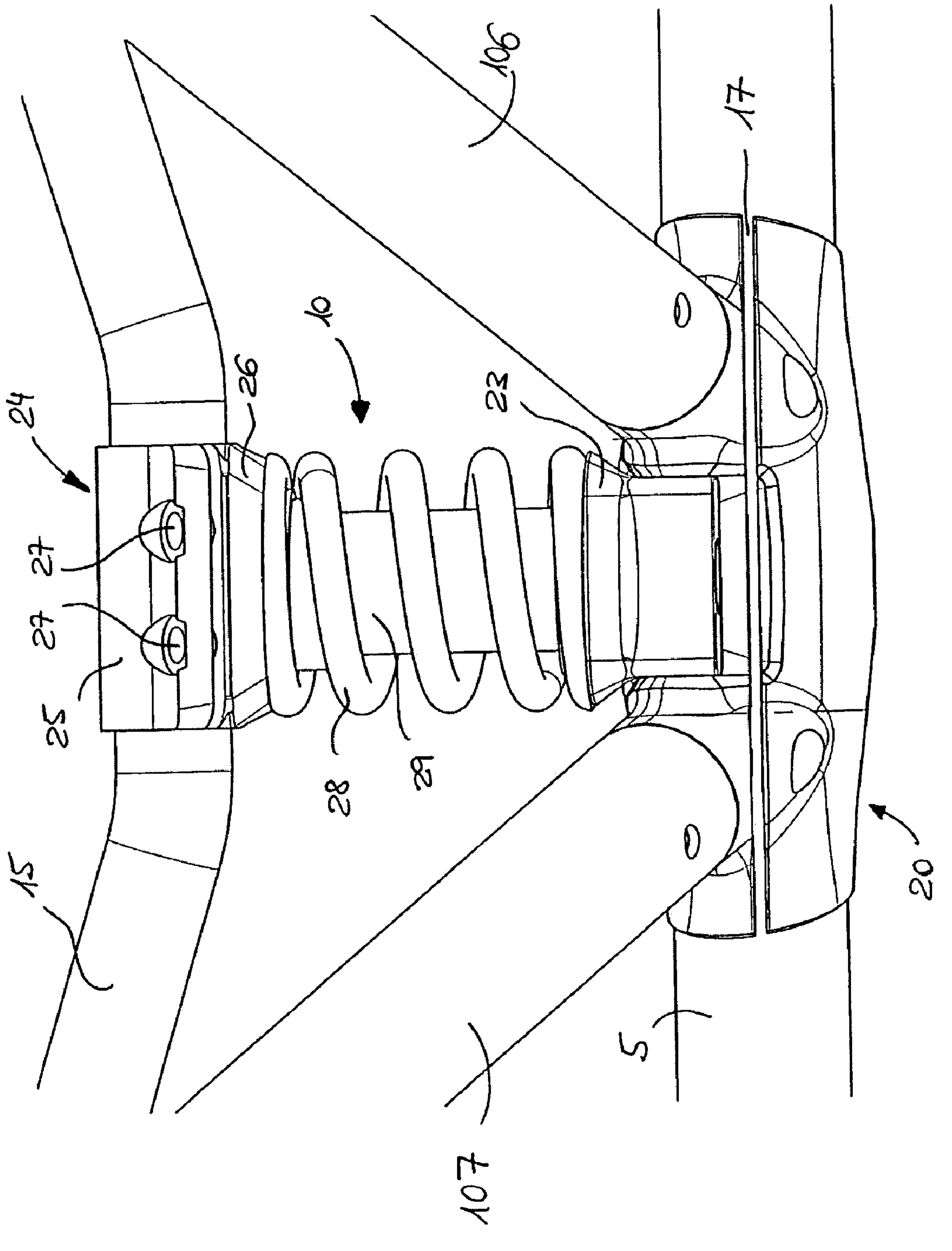
FIG. 2 is a close front view of a first embodiment of a support device according to the present invention.
Figure 3:
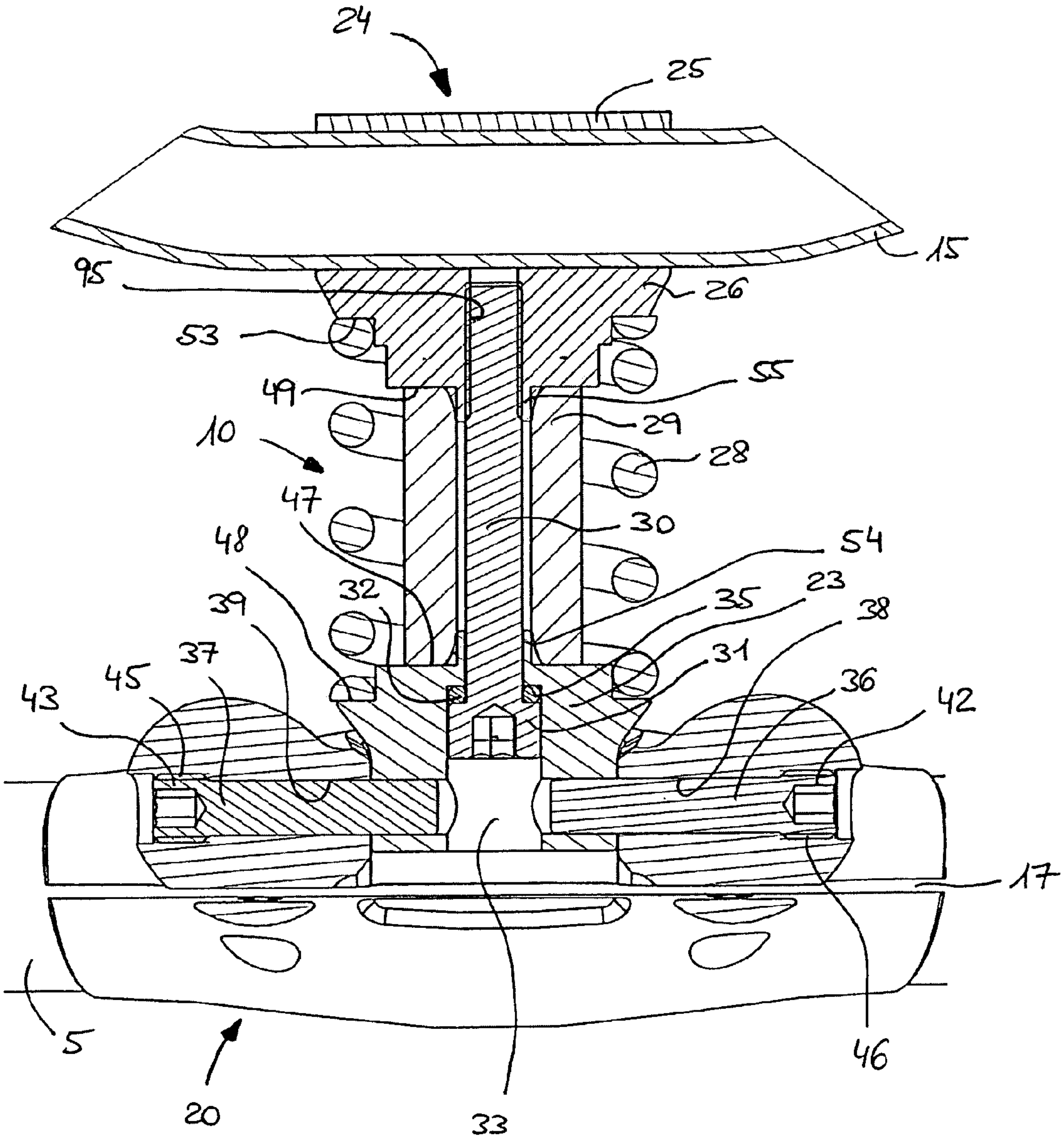
FIG. 3 is a longitudinal vertical section of the embodiment of FIG. 2.

As illustrated on FIGS. 2 and 3 the first embodiment of the support device 10 of the present invention comprises an intermediate element, located between a pivot part 23, pivoting into a seat provided in a central part 20 fixed to the axle 5, and a fixing element 24 attached to the seat tube 15. The intermediate element comprises a spring 28 and a shock absorber element 29, the shock absorber element (e.g., an elastomer element) being located in the lacuna provided by the spiral turns of the spring 28. At their bottom ends, the spring 28 and the shock absorber element 29 are seated on pivot part 23, which is pivotally attached to the axle 5 by means of a center part 20 mounted around the axle 5 and which will be described in detail later. The pivoting axis of pivot part 23 is parallel to axle 5. The center part 20 also harbors, on left and right sides of the pivot part 23, the rear ends of the rear left and right sections 106, 107, respectively, of the frame tubes. A longitudinal slot 17 in the center part 20 is visible extending from left to right along the axle 5. This slot is necessary for tightening the center part 20 around axle 5, while permitting some adjustment of the center part to the diameter of the axle 5.

At their top ends, the spring 28 and shock absorber element 29 abut to the lower part 26 of fixing element 24, which will also be described in more detail later.

As can be seen in FIG. 3, a fixing screw 30 extends along the central axis of the support device, through a central hole provided in the pivot part 23 and a central boring 95 provided in the shock absorber element 29. The screw 30 is anchored in the boring 95 of lower part 26 of fixing element 24, the head 31 of the screw 30 abutting upon an inner sleeve 35 of pivot part 23. In this way, the screw 30, when tightened by a thread or nut present in fixing element 24, attaches the support device of the invention 23, 10, 24 to the seat tube 15, the pivot part being itself pivotally attached to the center part 20 attached on the middle of axle 5. A ring 32 is preferably located between the head 31 of screw 30 and sleeve 35.

With respect to the pivotal attachment of the pivot part 23, left and right pins 36, 37, are seated in left and right borings, 38, 39, respectively, provided in the center part 20 and oriented in parallel to axle 5. As is better visible in FIG. 4A to 4C, these left and right borings, 38, 39, are located at the bottom of left and right supports 66, 77, intended to receive the left and right frame tubes, respectively.

The pins 36, 37 extend from their respective borings 38, 39 in the center part 20 towards each other, into corresponding borings provided in the centrally located pivot part 23, thus providing a pivoting articulation for the pivot part 23.

While pins 36, 37 penetrate into a substantial part of pivot part 23, to provide sufficient footing for the pivoting articulation, they do not extend through it entirely, but leave a free space 33 in the center, to permit access to the head 31 of screw 30. As will be discussed further below, the free space 33 is helpful when exchanging the intermediate element 10. Furthermore, the free space 33 may be temporarily occupied by the head 31 of screw 30, when the latter is descending upon compression of spring 28 and shock absorber element 29, upon absorption of shocks experienced by the wheelchair.

The left and right pins 36, 37, each comprise a head, 42, 43, each of which is threaded in the lateral boring 45, 46, the central borings 38, 39, housing the axel-forming part of the pins 36, 37.

FIG. 3 also shows that pivot part 23 comprises, on its top vertical end, even and substantially horizontal surfaces 47 and 48, on which the shock absorber element 29 and spring 28 bear. Both surfaces 47, 48, if viewed from top, have the form of a ring, with surface 47, on which the shock absorber element 29 bears, having a central opening for the passage of the screw 30. Surface 48 is situated laterally and lower than surface 47 with a radial dimension substantially corresponding to the thickness of the spring 30.

The bottom end of lower part 26 of fixing element 24 substantially mirrors the dimensions of the top vertical end of pivot part 23, thus providing ring-shaped surfaces 49 and 53. With screw 30 anchored in fixing element 24, spring 28 is stably clamped between surfaces 48 and 53 of the pivot part and the fixing element, respectively. Lateral displacement of the spring being prevented by the vertical offset of surfaces 47 and 49, respectively. The shock absorber element 29, on the other hand, is clamped between inner, ring-shaped surfaces 47 and 49, and further stabilised by annular protrusions 54 and 55 of the pivot part 23 at the shock absorber element's bottom end and on the fixing element 24 at the shock absorber element's upper end, respectively, said protrusions preventing lateral displacement of the shock absorber element 29.

Figure 4A:
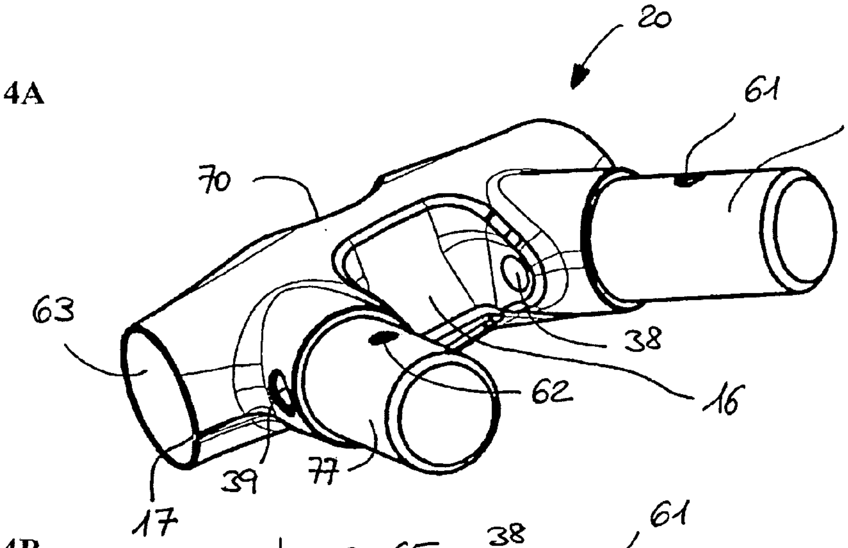
FIG. 4A is a perspective view of a central part for pivotally lodging the support device of the present invention.
Figure 4B:
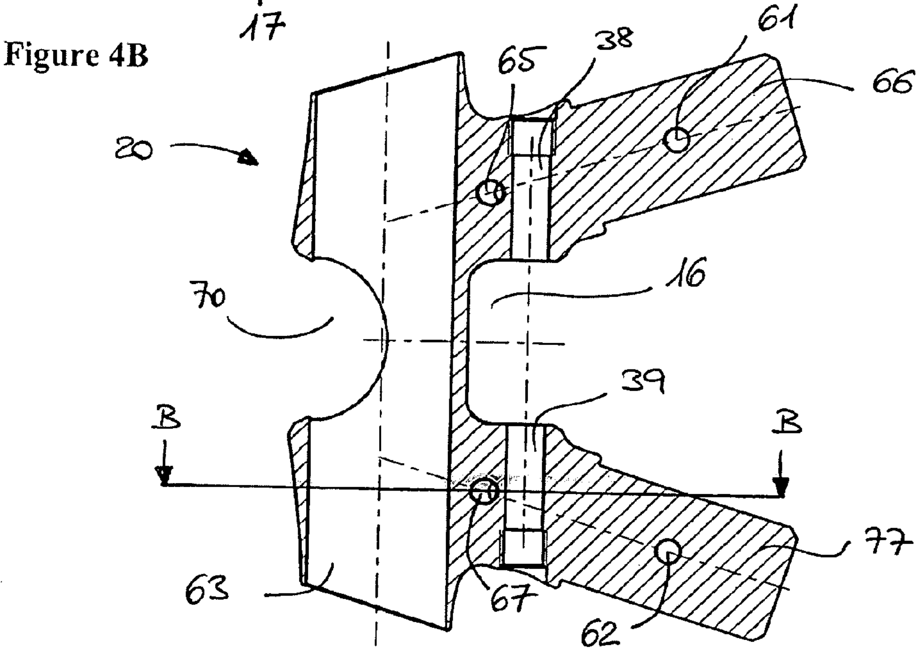
FIG. 4B is a horizontal section of the central part of FIG. 4A.
Figure 4C:
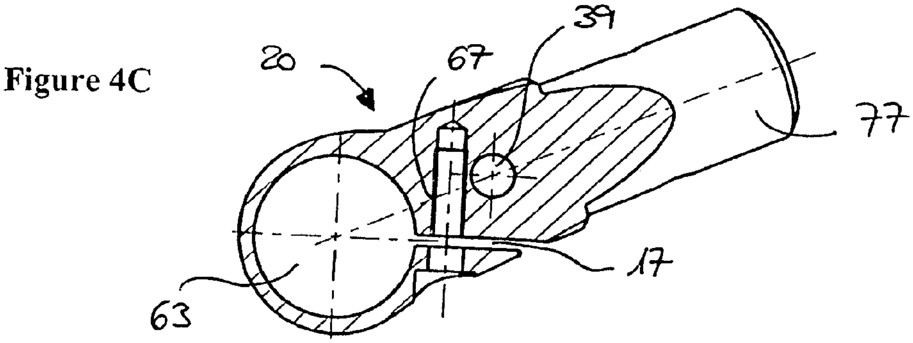
FIG. 4C is a vertical, lateral section of the central part at line B-B shown in FIG. 4B.

The central part 20 is better represented on FIGS. 4A, 4B and 4C. It can be seen that the central part 20 is provided in a single piece. It comprises a free space 16 intended to receive the pivot part 23 and which is sufficiently deep to allow for pivoting of the latter. This free space 16 is actually created by the gap between the left and right cylindrical structures 66, 77, intended to receive the rear left and right sections 106, 107, respectively, of the frame tubes 6 and 7. Openings of the left and right borings 38, 39 are also visible. The distal ends of the cylindrical structures 66, 77, have diameters slightly smaller or equal to the internal diameter of the left and right rear sections 106, 107, respectively, permitting telescopically setting said sections 106, 107, and thereby, the frame tubes 6, 7, onto said cylindrical support structures. Left and right holes 61, 62, in each support structure 66, 77 allow for detachably attaching said sections 106, 107 to said support structures 66, 77, for example, by means of a screw or a pushable pin. The cylindrical hollow 63, designed to harbor axle 5 is also visible. Also, slot 17 and opening 70 are visible.

Left and right borings 65, 67 are intended to house screws to permit tightening of the central part 20 around axle 5 (see FIG. 3), while diminishing the breadth of slot 17 (FIG. 4A).

FIG. 4C shows the vertical orientation of boring 67 and the position of slot 17, thus illustrating that central part 20 will be tightened around axle 5 when a screw is tightened in boring 67, compressing slot 17 and thus diminishing the dimension of cylindrical hollow 63, intended to harbor axle 5. A thread for said screw (both not shown in FIG. 4C) may be present in the upper end of boring 67.

Figure 5A:
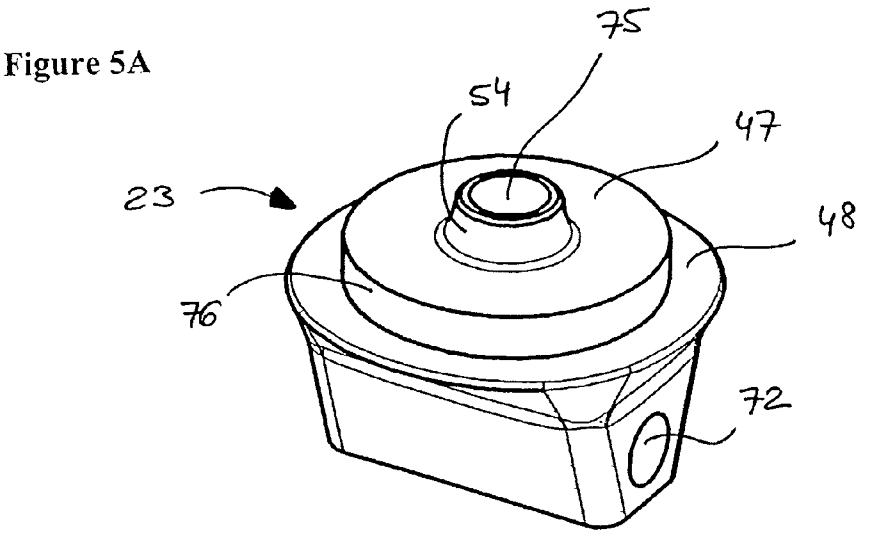
FIG. 5A is a perspective view of the pivot part of the support device of the present invention.
Figure 5B:
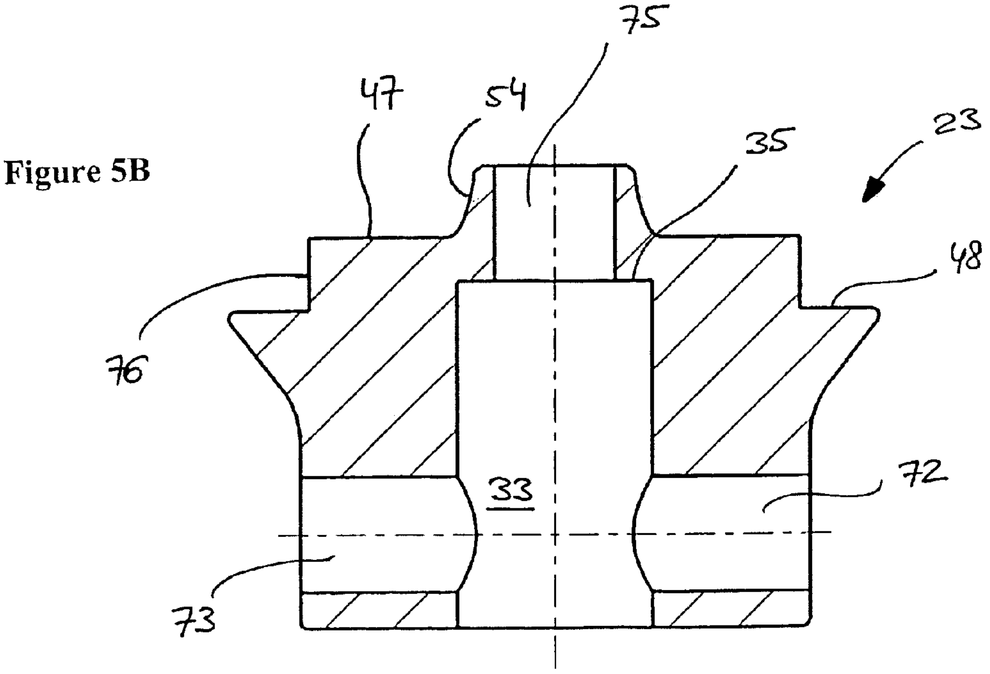
FIG. 5B is a longitudinal vertical section of the pivot part of FIG. 5A.

FIGS. 5A and 5B show further details of pivot part 23. An annular protrusion 54 surrounding boring 75, in which the screw 30 (not visible) is to be held, is provided on top of pivot part. Ridge 76 illustrates the vertical offset between ring-shaped surfaces 47 and 48, which is relevant for preventing lateral movements of intermediate part 10, when placed between pivot part 23 and the lower part 26 of fixing element 24 (not shown). Borings 72 and 73 are intended to harbor the central ends of pins 36, 37.

Figure 6A:
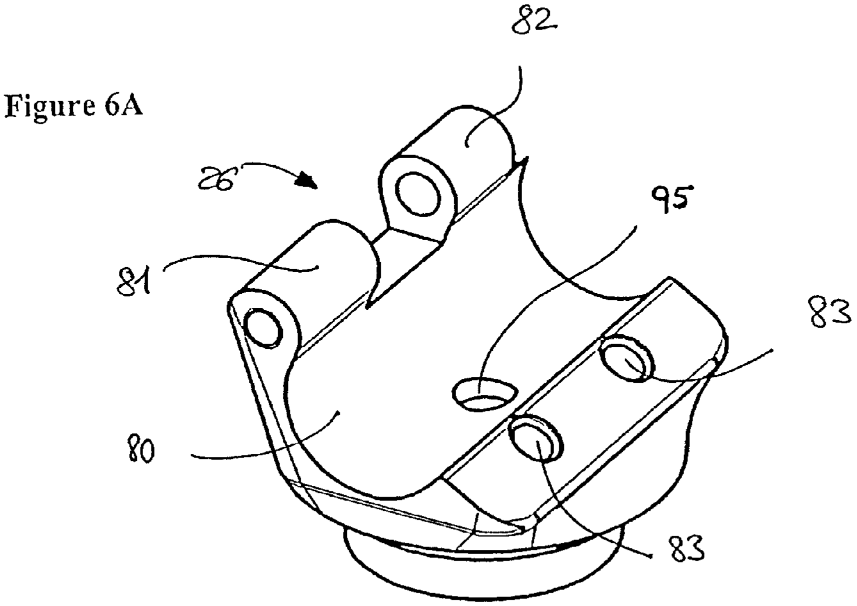
FIG. 6A is a perspective view of the lower part of the fixing element of the support device of the present invention.
Figure 6B:
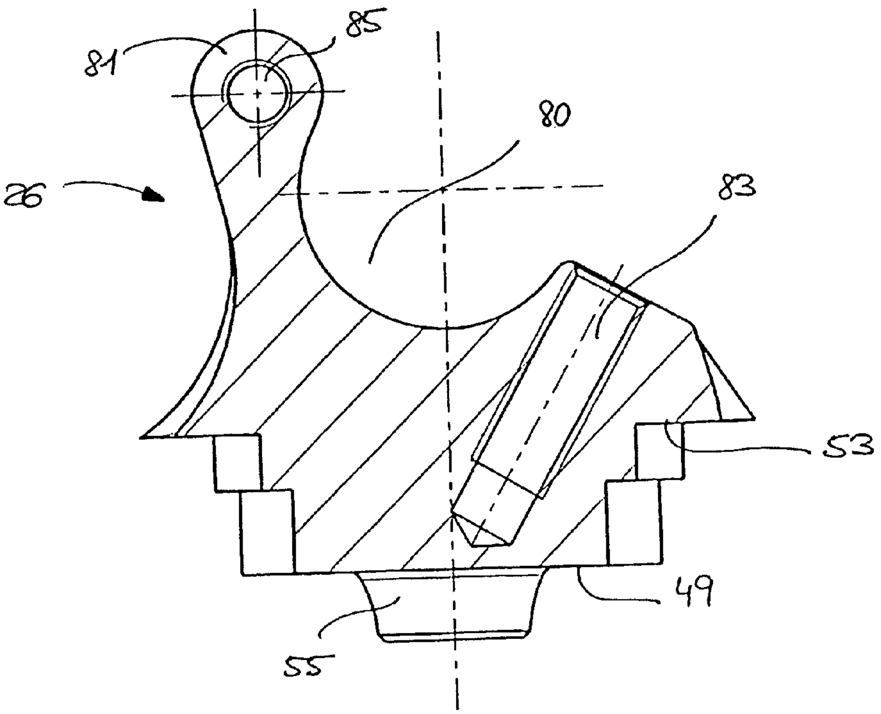
FIG. 6B is a vertical transverse section of the lower part of FIG. 6A.
Figure 7A:
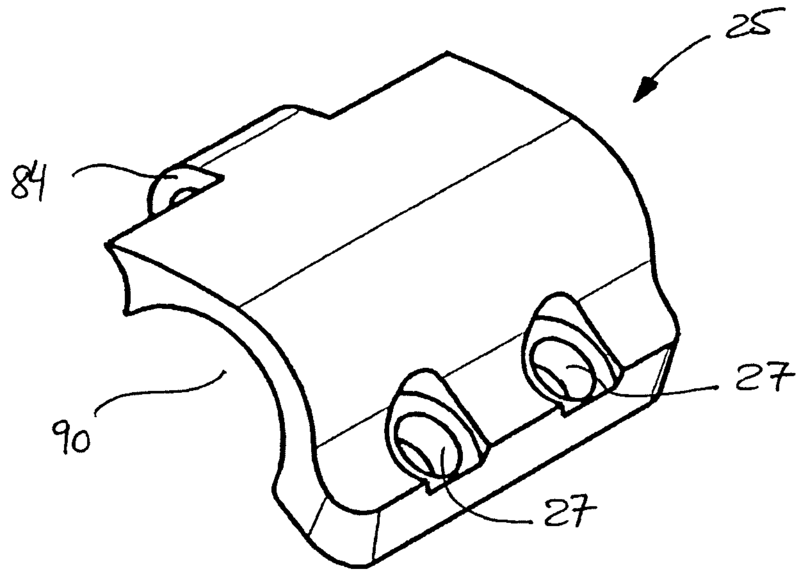
FIG. 7A is a perspective view of the upper part of the fixing element of the support device of the present invention.
Figure 7B:
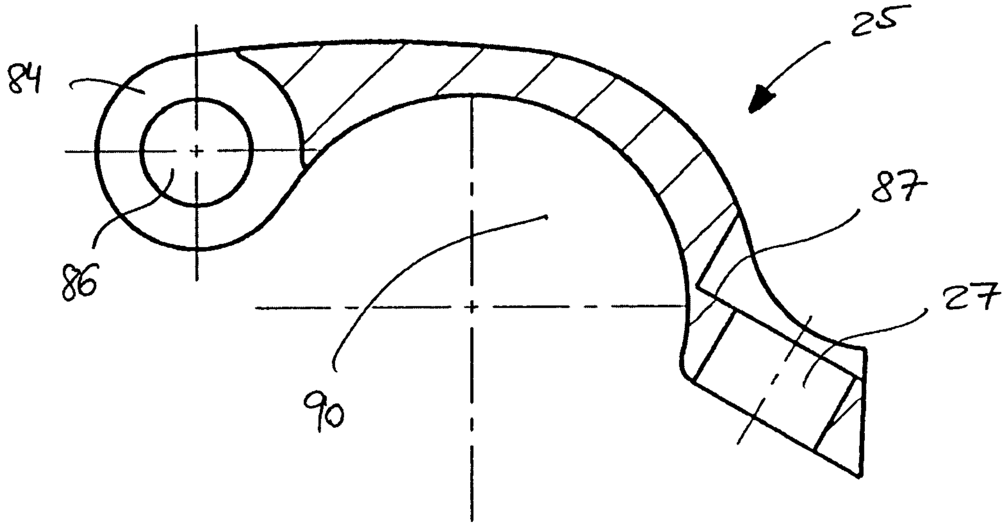
FIG. 7B is a vertical transverse section of the upper part of FIG. 7A.

Details of the lower part 26 and upper part 25 composing the fixing element 24 forming a clamp around seat tube 15 are shown in FIGS. 6A and 6B and in FIGS. 7A and 7B, respectively.

In FIG. 6A, the concave surface 80, having a circular form in cross-section, is visible. This concave surface 80 is designed to fit with the diameter of the seat tube 15 (not shown) and, when harboring said tube, covers about half of its circumference. In the center of said concave surface 80, the extension of boring 95 is visible, in which screw 30 is to be harbored and tightened by means of a thread. The fixing element 24 has a hinge-joint configuration, with a hinge being formed between lower part 26 and upper part 25, by means of hinge-joint elements 81, 82, with a common central axis, but leaving a gap between them for inserting a corresponding hinge-joint provided in the upper part 25 (FIG. 7). Borings 83 are provided in the other (front) side of concave surface 80, which comprise threads so as to fix said upper part 25 by means of screws to said lower part 26 at the front side of the fixing element 24 (not shown).

In FIG. 6B, the situation of the even ring-shaped surfaces 53, 49 is indicated. Also, the protrusion 55 is visible, in which a boring 95 for harboring the screw 30 extends (not shown). The section provided in FIG. 6B is slightly lateral and extends vertically along one of the borings 83, thus showing the orientation of the latter in the lower part 26.

As illustrated by FIGS. 7A and 7B, the upper part 25 mainly forms a concave surface 90, which is intended to harbor about half of the circumference of the seat tube 15 (not shown), the other half being covered by concave surface 80 of lower part 26 (see FIGS. 6A and 6B). The hinge-joint element 84, visible in a central position at the rear part of the upper part 25 is adjusted to fit between hinge-joint elements 81, 82, of lower part 26 and to thus form the hinge joint with the latter, a pin or axle being placed so as to extend through holes 85 and 86 of the hinge-joint elements of the upper and lower parts 25 and 26, respectively. In both, FIGS. 7A and 7B, the openings 27 for a screw to be placed are shown, with the head of said screw abutting against surface 87. Said screw will extend through borings 83 (FIGS. 6A and B) and thus permit tightening fixing element 24 around seat tube 15.

Figure 8:
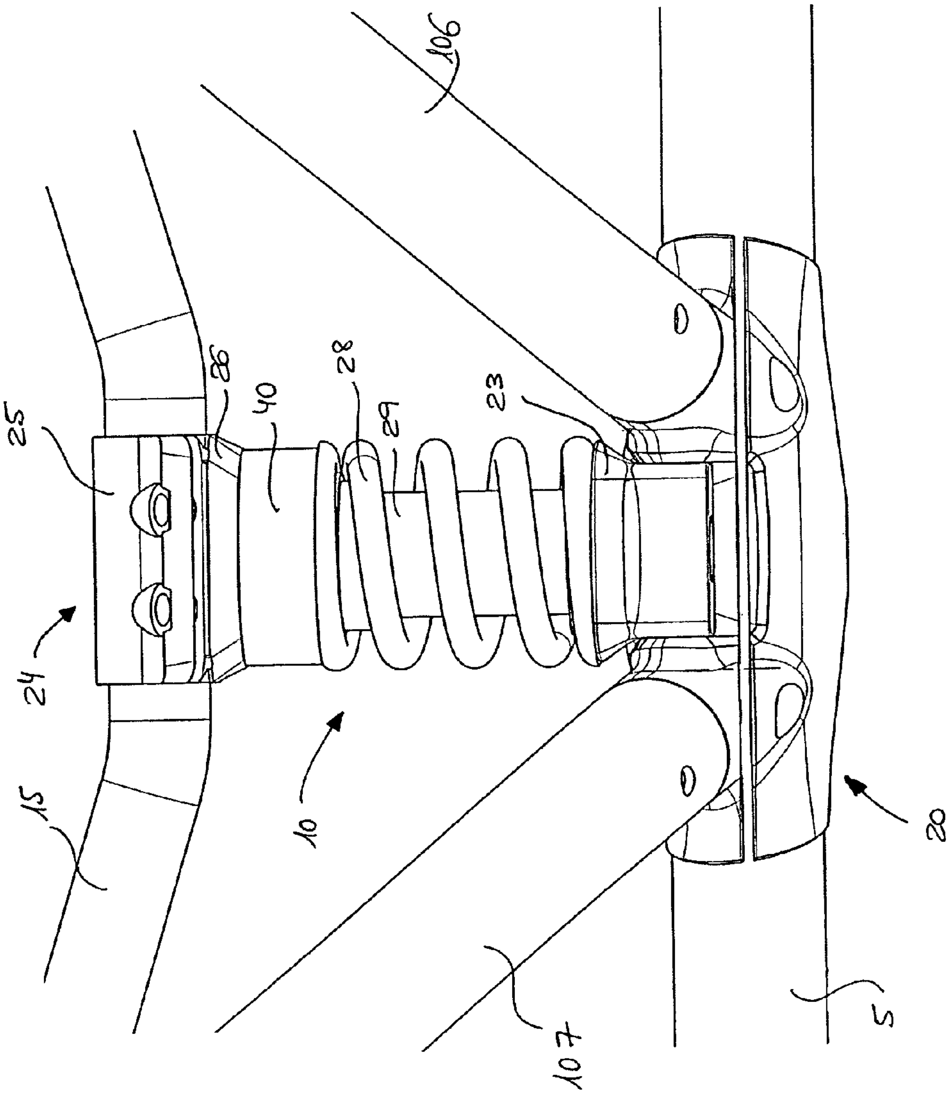
FIG. 8 is a close front view of a second embodiment of a support device according to the present invention.

FIG. 8 show a second embodiment of the support device of the present invention. In this embodiment, a washer 40 is placed between the intermediate element comprising the spring 28 and the shock absorber element 29, and the lower part 26 of the fixing element 24. With the washer 40 at this position, the distance between axle 5 and seat tube 15 is increased by the thickness of the washer 40, thus increasing the rear seat height of the wheelchair.

It is clear that washers of various thickness can be used for increasing rear seat height. However, the washer could also be used to keep rear seat height constant when a spring and/or shock absorber element smaller than that shown in FIG. 2 is used. Springs of different strengths can thus be employed without affecting rear seat height. Accordingly, the combination of intermediate element 10 and washer 40 allows various adjustments according to the wheelchair user's preferences.

Figure 9:
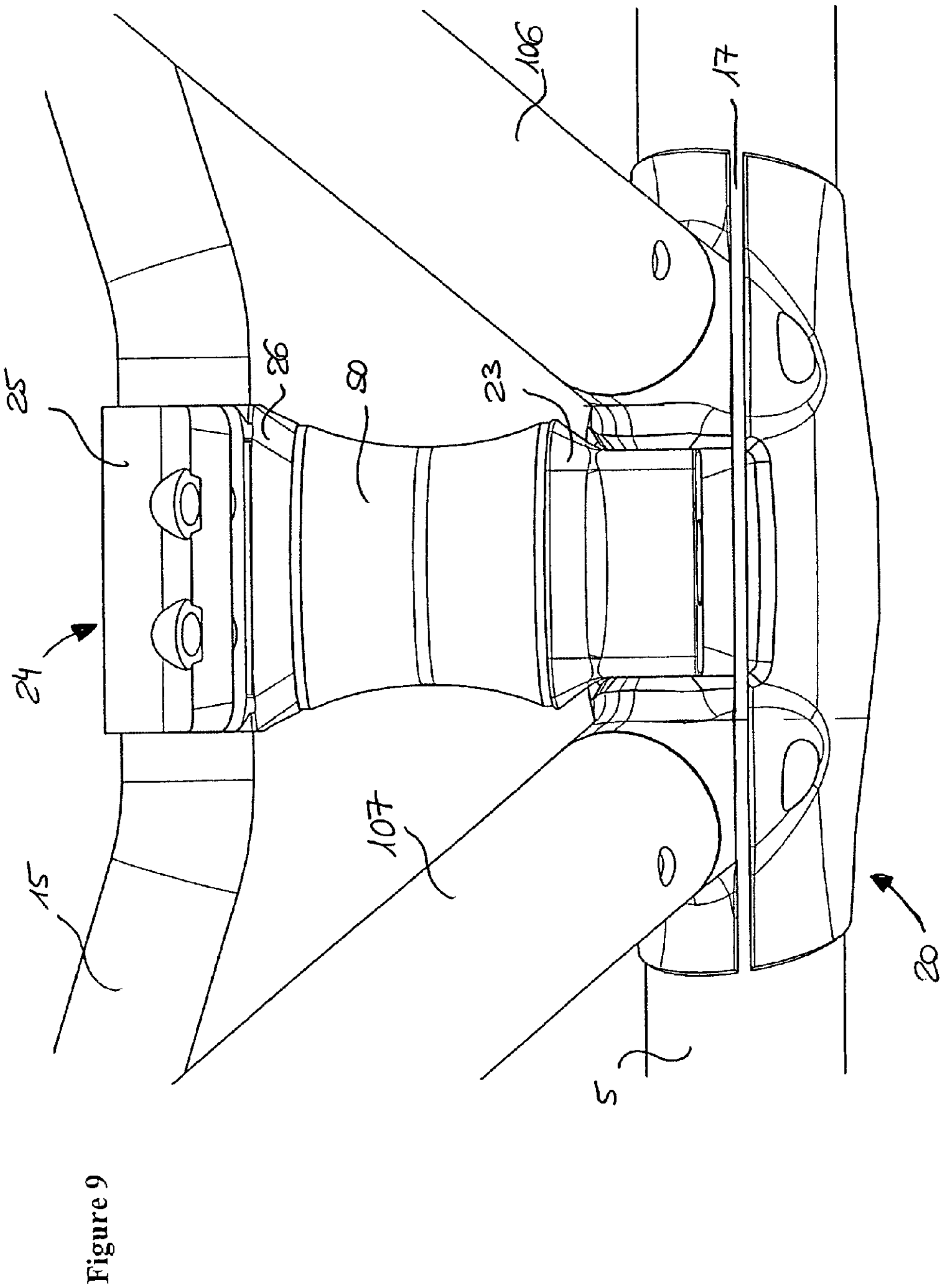
FIG. 9 is a close front view of a third embodiment of a support device according to the present invention.
Figure 10:
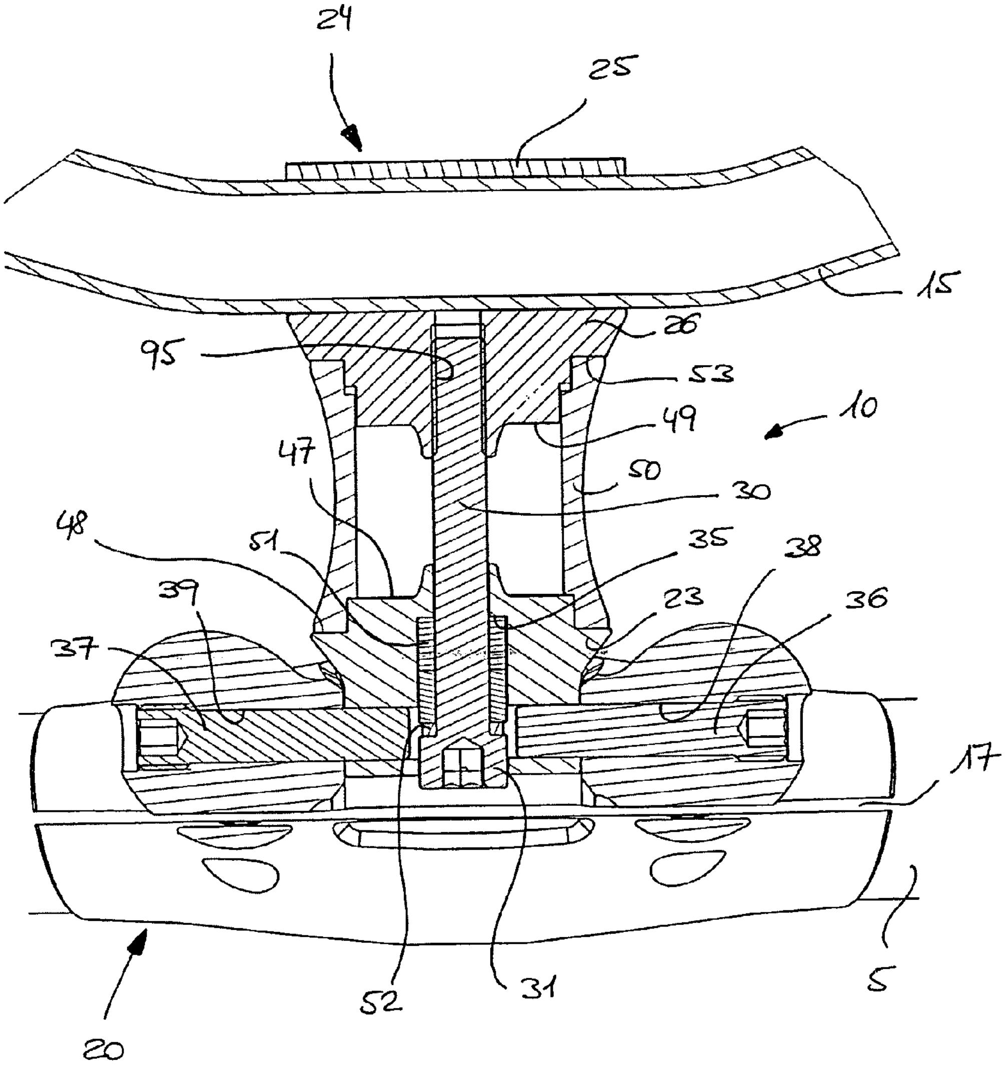
FIG. 10 is a longitudinal vertical section of the embodiment of FIG. 9.

FIGS. 9 and 10 show a third embodiment of the support device of the present invention. Instead of a spring/shock absorber element, the intermediate element consists in a rigid element 50. The rigid element 50 is put in place when the spring and shock absorbing function is not desired.

As is better shown in FIG. 10, the rigid element 50 resembles a hollow column, with the screw 30 extending along the central, vertical axe of said column. In this embodiment, rear seat height is adjusted to a relatively low level, rigid element 50 being shorter than the spring 28 in FIG. 3. For this reason, small washers 51 are situated between the head 31 of screw 30 and sleeve 35, to account for the length of screw 30. Instead of small washers 51, a shorter screw 30 could, of course, be used with the same result. However, as the situation is in FIG. 10, the head 31, abutting against a ring 52, for example, a washer, situated below small washers 51, is now situated lower in pivot part 23 and occupies nearly all space (33 in FIG. 3) provided between the central ends of pins 36 and 37.

Similar to the situation in FIG. 3, the vertically offset, ring-shaped surfaces 47, 48 on the pivot part 23 and 49, 53 on the lower part 26 of fixing element 24 provide for the lateral stabilisation of the intermediate element 10, here rigid element 50.

The rear seat height may be adjusted by using rigid elements of different lengths and/or by using washers as discussed hereunder.

Figure 11:
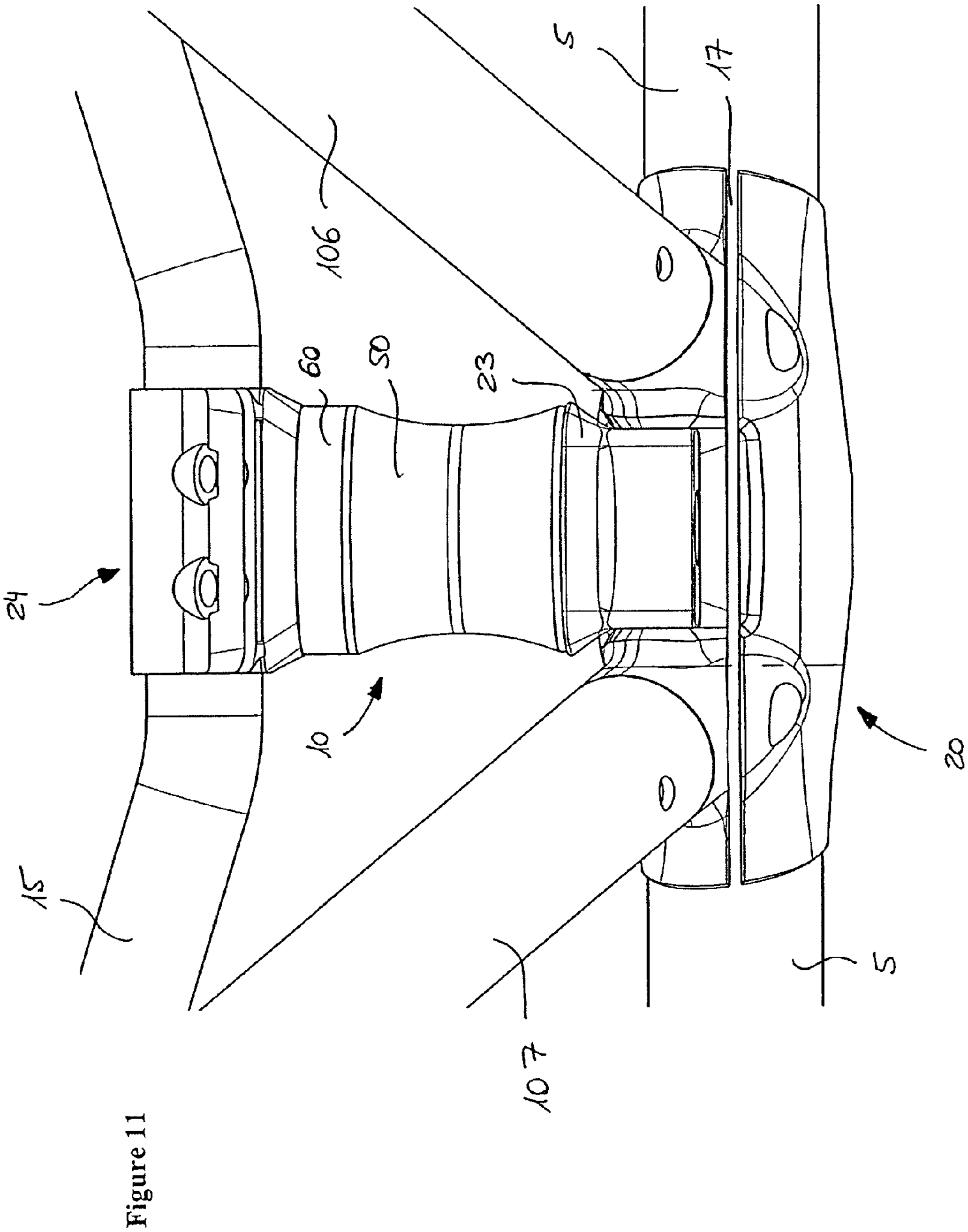
FIG. 11 is a close front view of a fourth embodiment of a support device according to the present invention.
Figure 12:
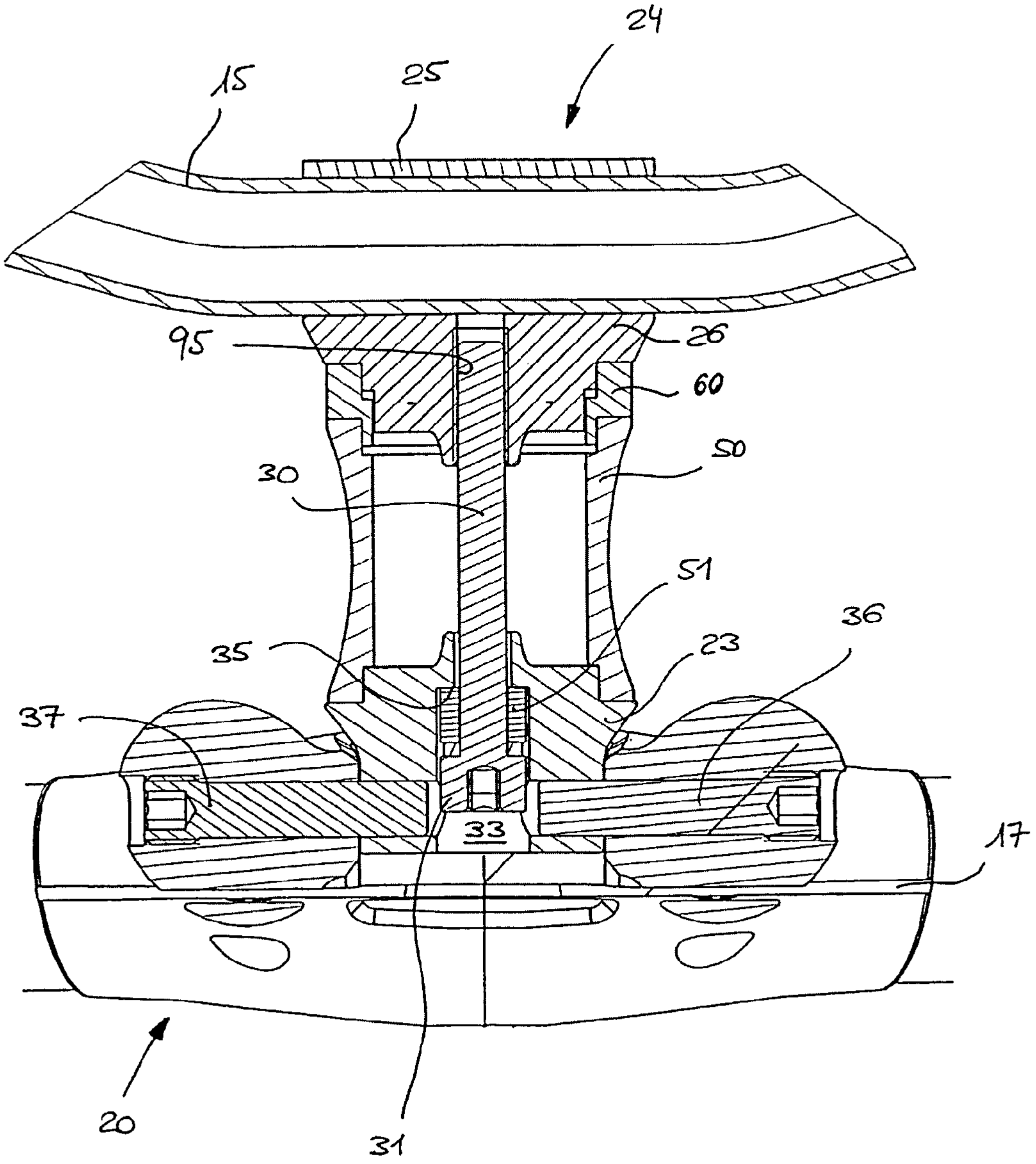
FIG. 12 is a longitudinal vertical section of the embodiment of FIG. 11.

FIGS. 11 and 12 show a fourth embodiment similar to that of FIGS. 9 and 10, but with increased rear seat height, due to the presence of washer 60 placed above rigid element 50, and below fixing element 24. As in the embodiments with the spring and/or the shock absorber element, the washer is clamped, together with the rigid element 50, by screw 30 (not visible), between pivot part 23 and fixing element 24, thus heightening the overall position of seat tube 15 with respect to axle 5, and, in consequence with respect to the ground on which the wheelchair is placed.

The purpose of washer 60 is to increase the distance provided by intermediate element, here rigid element 50. In this embodiment, contrary to the one of FIG. 10, only one, instead of two small washers 51, is placed between head 31 of screw 30 and the inner sleeve 35 of pivot part 23, because of the increased distance, resulting in increased rear seat height, provided by the combination of rigid element 50 and washer 60. The washer 60 has an upper profile that fits the profile of the lower end of lower part 26 of fixing element 24, and a lower profile that fits the profile of the upper end of intermediate element, here rigid element 50.

Figure 13:
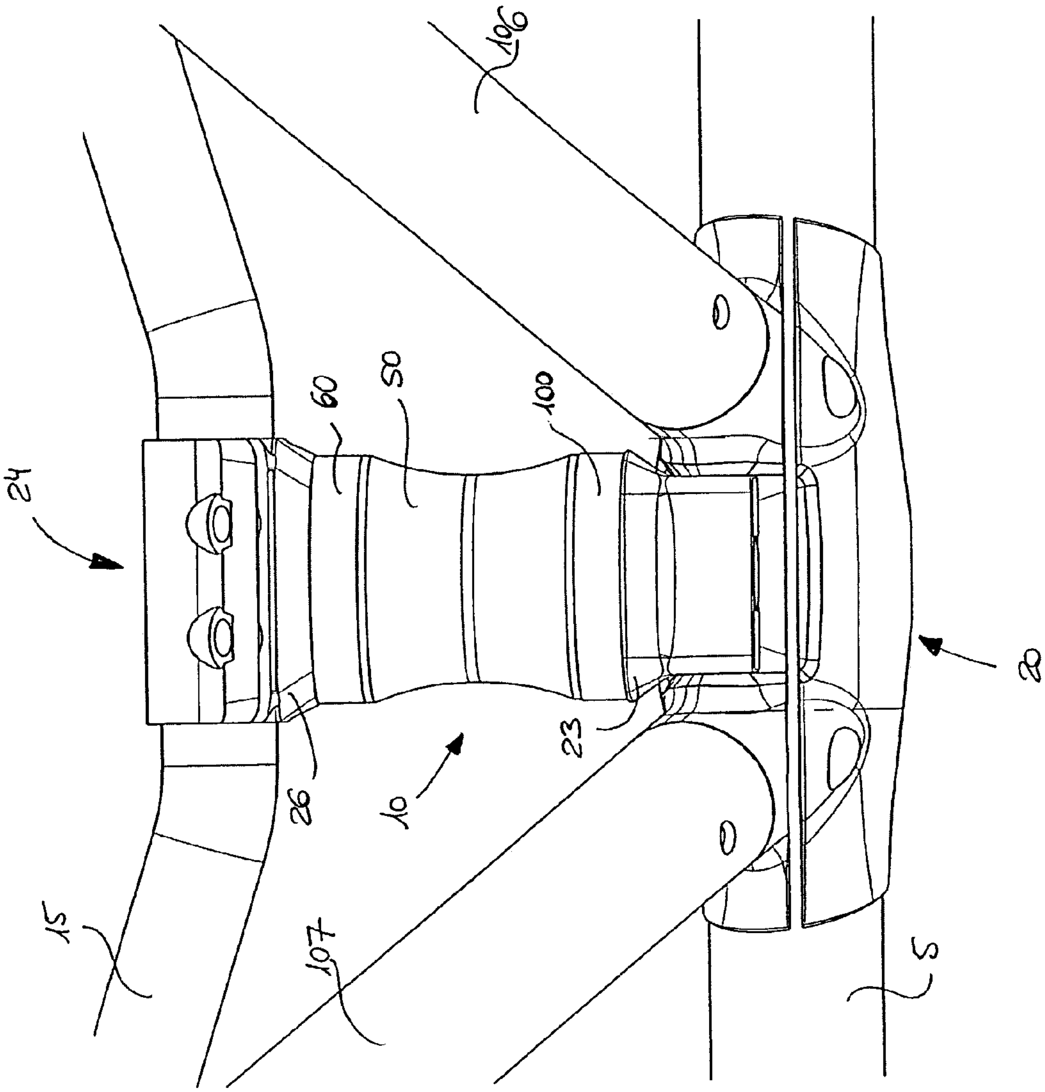
FIG. 13 is a close front view of a fifth embodiment of a support device according to the present invention.

FIG. 13 shows a fifth embodiment of the support device of the present invention, comprising two washers 60, 100 positioned directly above and below, respectively, of rigid element 50, thus further increasing rear seat height. The lower washer 100 is, in this case, placed between pivot part 23 and rigid element 50.

The advantages of the support device of the present invention in terms of adjusting parameters of the wheelchair will now be described.

The support device of the present invention allows adjustment of rear seat height and of absorption characteristics.

Accordingly, the intermediate element (28, 29, 50) can be easily removed, replaced and or supplemented with washers 40 to increase rear seat height. To this end, the head 31 of screw 30, situated in pivot part 23, is accessible and can be loosened with a suitable tool, by the wheelchair user or technical staff of a wheelchair vendor. Screw 30 being loosened, fixing element 24 can be manually separated from said screw and pivot part 23. The latter can be pivoted towards the front of the wheelchair and the intermediate element, for example, a spring 28 and a shock absorber 29 may be further supplemented with a washer 40, or may be replaced by a rigid element 50, with or without washer 60, 100. Once all desired replacements or supplements being put on pivot part 23, the latter is pivoted back to its substantially vertical position and the lower part 26 of fixing element 24 is fitted unto exchanged and/or supplemented intermediate element. Then, screw 30 is again tightened to clamp the intermediate element, with or without washers, between pivot part 23 and fixing element 24, thus connecting the seat tube 15 to axle 5.

Absorption parameters of the wheelchair may be adjusted by selecting suitable intermediate elements. A spring 28 can be used alone, but preferably in combination with a shock absorber element 29, the latter having the purpose of absorbing shocks. Of course, springs of different strengths and elastomers of different materials, such as rubbers, or gas filled shock absorbers exhibiting different absorbing characteristics may be selected according to the wheelchair users preferences or physical properties, for example, according to the weight of the wheelchair user. Also, rigid elements 50 may be used to provide intermediate element, thus minimizing shock absorption and cushioning properties of the support device and providing an overall wheelchair nearly devoid of these properties. The later may be desired if the wheelchair is to be used on even, flat surfaces and/or if loss of kinetic energy by absorption is to be prevented, for example, in wheelchair races. It should further be noted that the above described arrangement combining the intermediate element (spring 28 and shock absorber 29) with the related design of the left and right frame tubes 6, 7 is unique in the wheelchair industry. This for reasons that, for the first time, special attention is given to solve the problem of shock loads transmission into the spinal and skeleton parts of the human body. By means of an oriented non-swinging spring/damper concept, the vibrations induced during wheelchair movements are absorbed and, accordingly, not transmitted into the spinal and skeleton parts of the human body.

Figure 14:
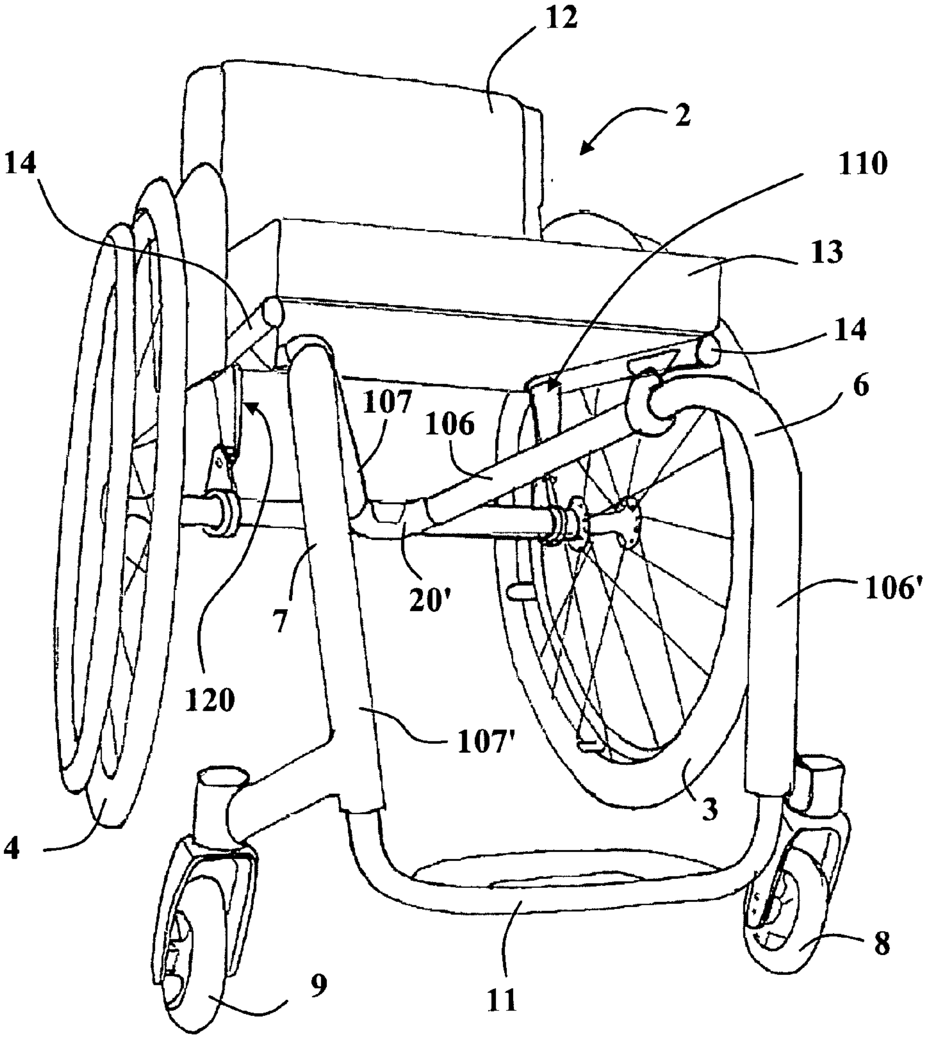
FIG. 14 shows a three quarter bottom front view of a second embodiment of the wheelchair of the present invention, in which the rear part of the seat is supported by a pair of articulated supports.

The embodiment of the wheelchair of FIG. 14 differs from the wheelchair shown in previous figures in that the central support device 10 is absent, and the function of supporting the seat 2 of the wheelchair at its rear part is accomplished by a pair of left and right articulated supports 110, 120, respectively. As can be seen in FIG. 14, the articulated supports are disposed laterally on the transversal axle 5, vertically below tubes of the chassis 14 of the seat, said tubes of the chassis extending on the lateral left and right side on the bottom of the seat 2 in the driving direction (rear-to-front). The rear part of the chassis 14 of the seat 2 is supported at two lateral positions, instead of a single central position as was the case with the embodiment of FIGS. 1-13. As a consequence, the stability of the seat is increased. In particular, lateral oscillations are avoided.

Figure 15:
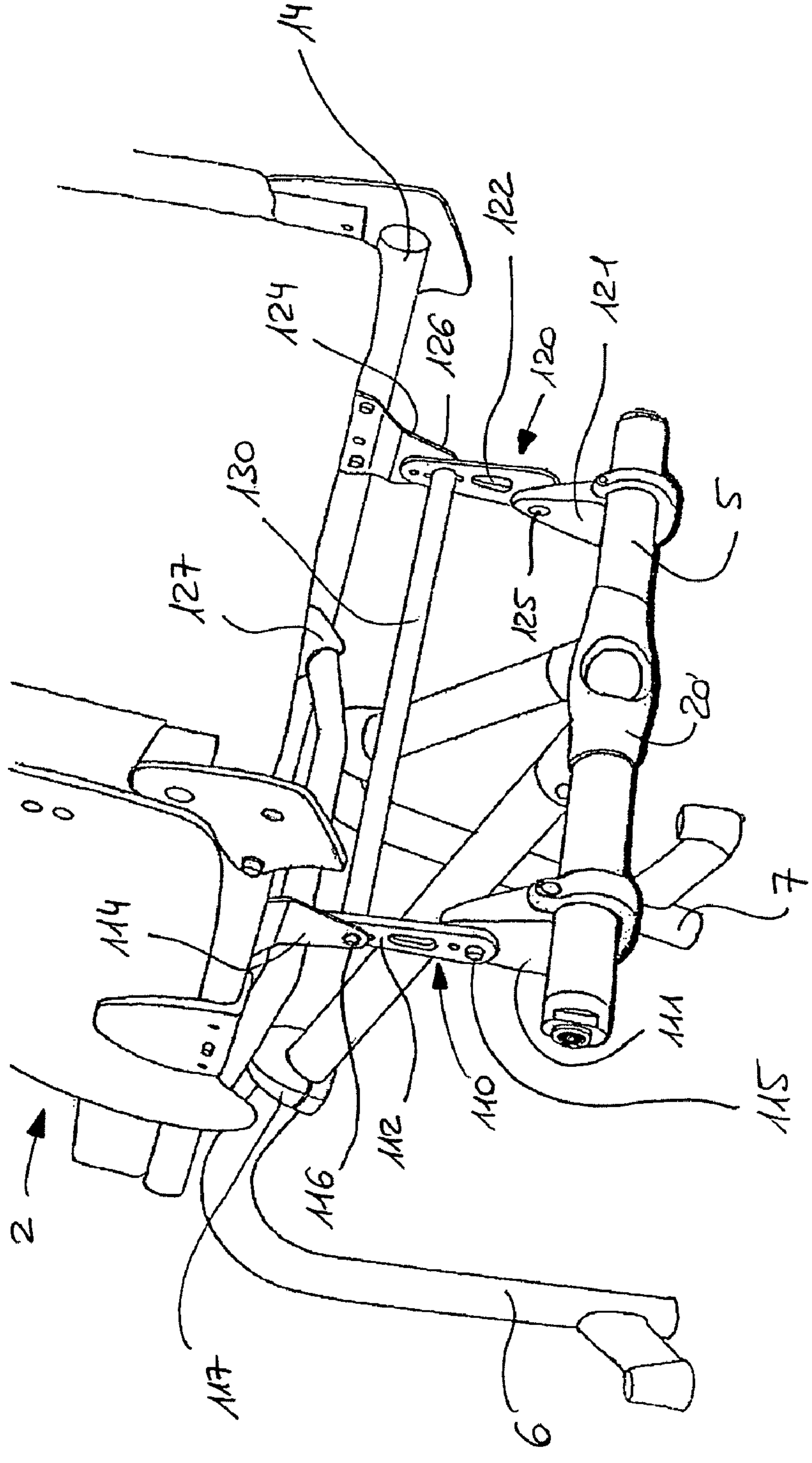
FIG. 15 is a close partial rear view of the wheelchair according to the embodiment of FIG. 14.

The support elements 110, 120 of the embodiment of FIG. 14 are shown in greater detail in FIG. 15, where the different components making up the articulation in these supports are well visible. Each left and right articulated support 110, 120, respectively, comprises an attachment 111, 121, which at least partly clamped to transversal axle 5, at left and right lateral positions of the axle, close to the left and right rear wheels (not represented in FIG. 15). The attachments 111, 121, in FIG. 15 have the configuration of clamps provided with an oblong, fortified section, extending in an upward direction. At its top end, each attachment 111, 121, is pivotally attached to a link element 112, 122, respectively, which in turn is pivotally attached to the chassis 14 of the seat, at lateral left and right positions of the chassis 14/seat 2. In the embodiment shown in FIG. 15, a second transversal axle 130 is provided. The left and right link elements 112, 122 are perpendicular to this second transversal axle 130 and are rigidly fixed to it at its distal left and right ends, forming altogether a Π-shaped element. This element is attached to the chassis 14 of the seat, at suitable left and right fixing plates 112, 124, so that the second transversal axle 130 is oriented horizontally, in parallel to the transversal axle 5. In this way, stable pivotal hinges 116, 126 are formed at the left and the right side of the chassis 14 with the second transversal axle 130 coordinating the pivoting movements of the left and right link elements 112, 122, preventing independent pivoting movement of the latter around pivoting hinges 116, 126, or 115, 125, respectively.

As the skilled person will appreciate, the lateral articulated supports 110 and 120, enable the adjustment of a number of parameters of the wheelchair according to the embodiment of FIGS. 14 and 15. Firstly, if the different elements 111, 112 and 114 on the left, and 121,122 and 124 on the right side of the wheelchair are rigidly attached to each other, by tightening screws at the pivoting hinges 115, 116, 125, 126, respectively, the height of the rear part of the seat 2 can be adjusted, namely by adjusting the angle between attachments 115, 125 and link elements 112, 122, before tightening said screws. Furthermore, it is possible to adjust the rear-to-front position of the seat 2 on the overall wheelchair, namely by moving the fixing points 117, 127, at which the front part of the seat 2 is attached to the lateral frame tubes 6, 7, at lateral left and right front sides of the seat 2. Since the pivoting hinges 115, 125 and 116, 126 of the articulated supports 110, 120 are also adjustable, the overall rear-to-front position of the seat 2 supported on the left and right frame tubes 6, 7 and on the transversal axle 5 can be adjusted according to a user's preferences.

Figure 16:
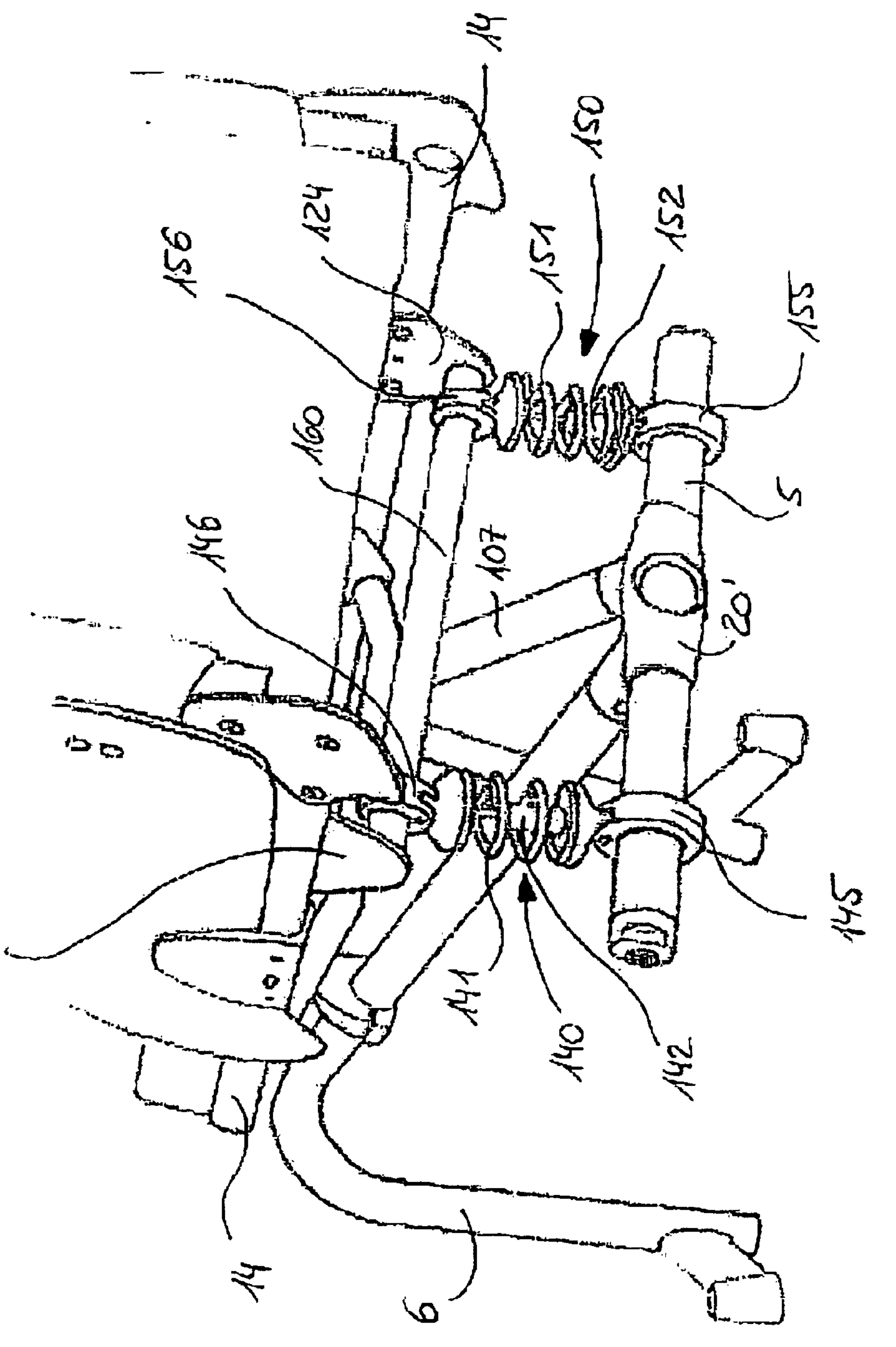
FIG. 16 is a close partial rear view of a third embodiment of the wheelchair of the present invention, in which the rear part of the seat is supported by a pair of spring and shock absorber devices.

The third embodiment of a wheelchair according to the invention shown in FIG. 16 differs from the embodiment of FIGS. 14 and 15 in that a pair of left and right substantially vertically arranged spring and shock absorber devices 140, 150 replace the articulated supports of FIG. 15.

A second transversal axle 160 (corresponding to the axis 130 of FIG. 15) is attached to the chassis 14 of the seat 2 through attachment surfaces provided by small left and right plates 114, 124. Ring-shaped clamps are disposed on the distal ends of the left 145, 114 and of the right 155, 156 spring/shock absorber devices 140, 150, respectively, and are designed to connect each device 140, 150 with a lower end to the transversal axle 5, and with the upper end to said second transversal axle 160, thus providing a support for the seat 2 on the transversal axle 5.

Advantageously, the embodiment shown in FIG. 16 has increased shock absorbing properties and may be preferred if a wheelchair is intended or prepared for uneven surfaces, for example, for an off-road excursion. The shock absorbing and spring properties are generally preferred for reasons of increased comfort.

As a variation of the embodiment shown in FIG. 16, it is, of course at the option of the skilled person to employ only a spring or a shock absorber alone on each left and right support position, to use other kinds of elastomers or to attach springs and shock absorbers at different positions, preferably along the transversal axle 5.

Figure 17:
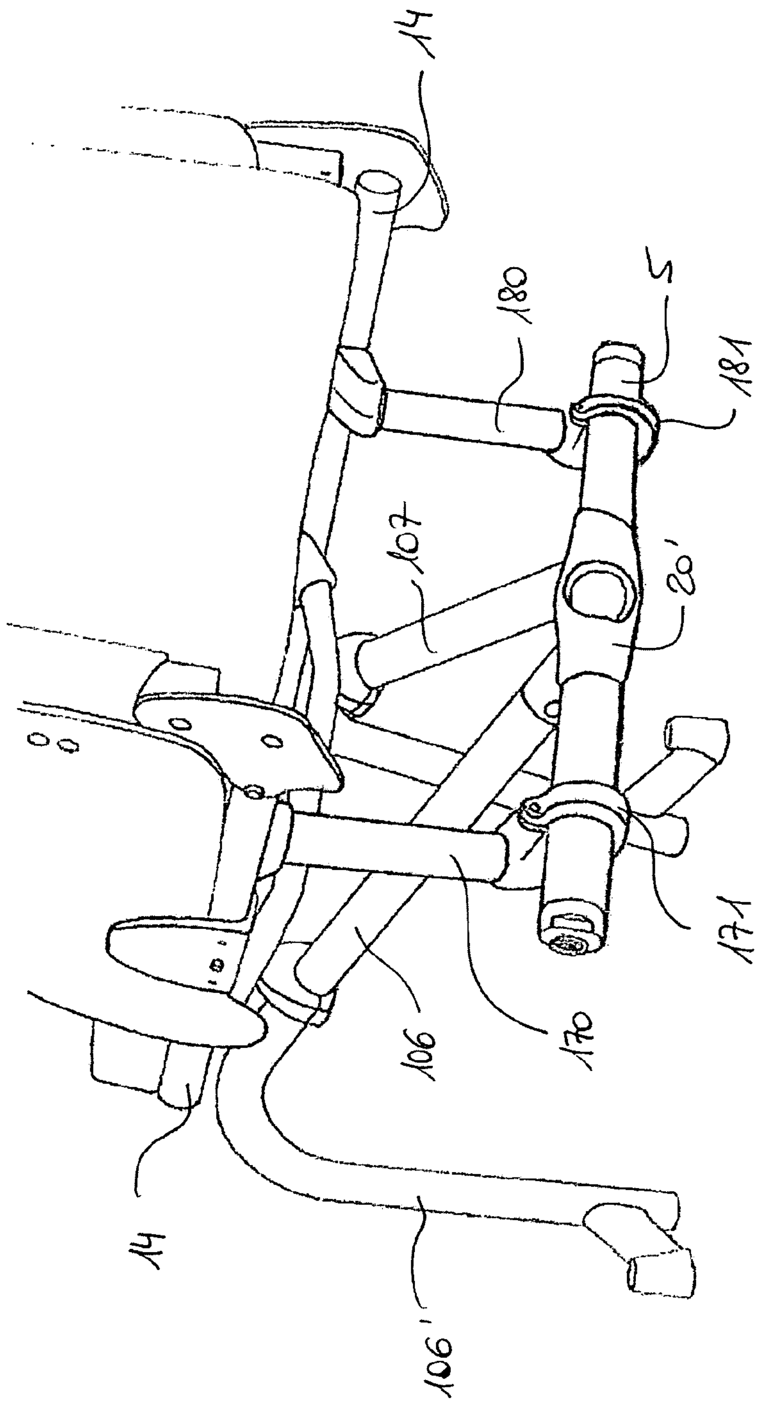
FIG. 17 is a close partial rear view of a fourth embodiment of the wheelchair of the present invention, in which the rear part of the seat is supported by a pair of vertically arranged struts.

FIG. 17 shows a further embodiment, in which the rear end of the seat 2 is supported on the transversal axle 5 by rigid vertical left and right struts (tubes) 170, 180, attached laterally on the transversal axle 5 by left and right clamps 171, 181, respectively, and directly attached to lateral tubes of the chassis 14 of the seat 2 by suitable attachments. In this embodiment, the height of the seat 2 can be adjusted by exchanging vertical tubes 170, 180 by corresponding shorter or larger tubes.

Figure 18:
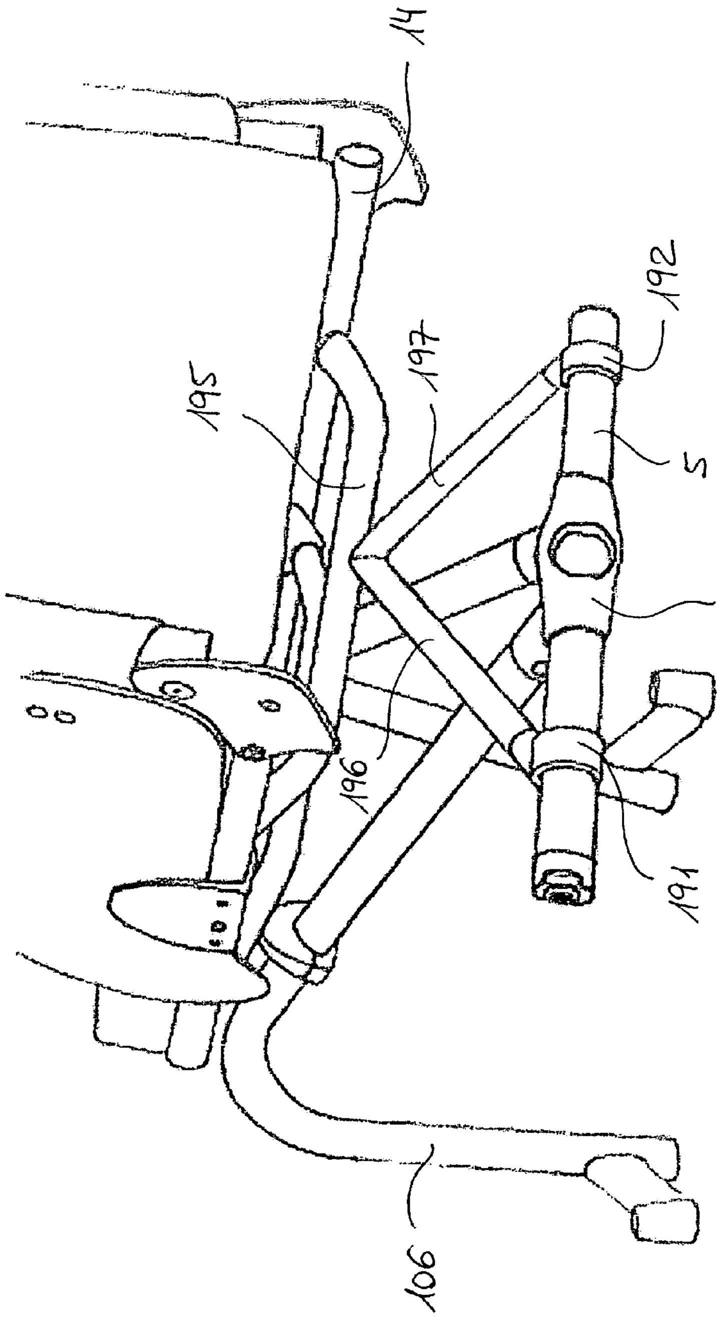
FIG. 18 is a close partial rear view of a fifth embodiment of the wheelchair of the present invention, in which the rear part of the seat is supported by a v-shaped device.

A still further embodiment of the wheelchair of the invention is shown in FIG. 18, where an inversed, V-shaped device 190 connects the transversal axle 5 to a cross-tube 195 of the chassis 14 of the seat 2. The v-shaped device comprises two legs, 196, 197, which at the point of their attachment to each other, are attached to the cross-tube 195 of the chassis 14. The distal ends of the legs 196, 197 are each attached to the transversal axle 5 by a suitable left and right clamps 191, 192 forming part of the v-device. In the device shown in FIG. 18, the distal ends of the legs are oriented downwards, so that they are connected with the transversal axle 5 at lateral left and right positions of the transversal axle 15.

As a variant of the embodiment of FIG. 18, the skilled person could also envisage a non-inversed v-shaped device, with the meeting point of the two lateral legs 196, 197 being connected to the center part 20', in a way similar to the support device 10 shown in FIGS. 1-13. The separate, distal ends of the legs of the v-shaped device could then be attached to lateral tubes of the chassis 14 of the seat.

In the embodiments of the wheelchair shown in FIGS. 14 to 18, a center part 20' is still present, for attaching the rear sections 106 and 107 of the left and right frame tubes 6, 7 to the transversal axle 5. It differs from the center part 20 of the embodiment of FIGS. 1 to 13 in that a central support device 10 is not present, as the support of the rear part of the seat 2 is accomplished by other structural elements described above with reference to FIGS. 14 to 18.

While the invention is described herein in conjunction with one or more exemplary embodiments, it is evident that many alternatives, modifications, and variations will be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof. Any element in a claim that does not explicitly state "means for" performing a specified function, or "step for" performing a specific function, is not to be interpreted as a "means" or "step" clause as specified in 35 U.S.C. §112, ¶6. In particular, the use of "step of" in the claims herein is not intended to invoke the provisions of 35 U.S.C. §112, ¶6.

We claim:

1. A wheelchair comprising a seat with a rear part and a front part, two left and right main wheels, connected by a transversal axle, and left and right lateral frame elements, wherein the rear part of said seat is supported on said transversal axle and the front part of said seat is supported on said lateral frame elements, respectively at a left side and a right side of the front part of the seat, such that said seat is supported at three positions, a central position substantially vertically above said transversal axle and two lateral positions corresponding to the left and right sides towards the front part of the seat, and wherein said lateral frame elements converge towards the rear part of the seat.

2. The wheelchair of claim 1, wherein at least one support element provides a supporting connection between the transversal axle and a chassis of the seat.

3. The wheelchair of claim 2, wherein said at least one support element comprises at least two lateral parts, a first one of which is attached to the transversal axle at a left distal section of said transversal axle and to a left side of a rear part of a chassis of the seat, and a second of which is attached to the transversal axle at a right distal section of said transversal axle and to a right side of a rear part of a chassis of the seat.

4. The wheelchair of claim 2, wherein said support element is selected from the group of:

a V-shaped device, comprising at least two legs with points of attachments present on the ends of the legs;

a pair of vertically arranged struts;

a pair of vertically arranged spring and/or shock-absorbers;

a pair of articulated supports, each comprising two pivotally connected elements, connecting the transversal axle to the frame of the seat; and a central support device.

5. The wheelchair of claim 1, wherein said left and right frame elements comprise rear ends attached to a center part mounted on said transversal axle.

6. The wheelchair of claim 5, wherein the center part is mounted substantially in the middle of said transversal axle.

7. The wheelchair of claim 5, wherein the seat comprises a chassis and wherein the center part bears a support device, which connects said center part and said chassis and thus supports the seat at a central, rear position of the seat.

8. The wheelchair according to claim 5, wherein the center part lodges a support device, said support device connecting the center part to a chassis of the seat.

9. The wheelchair according to claim 5, wherein the center part bears a support device, comprising an intermediate element, wherein an upper end of said intermediate element is connected to a transversal tube of a chassis of the seat, the support device thus supporting the seat on said center part via said intermediate element.

10. The wheelchair according to claim 5, wherein a support device is pivotally lodged between left and right support structures of the center part, said support structures receiving said rear ends of said left and right frame elements.

11. The wheelchair according to claim 5, wherein the center part is attached to the transversal axle, and connects both the left and right frame elements to the axle.

12. The wheelchair of claim 1, wherein said left and right lateral frame elements extend downwardly at a front side of the wheelchair, wherein said left and right lateral frame elements have respectively a left and a right front bottom end, wherein each of said left and right front bottom ends of said left and right lateral frame elements comprises a structure to which left and right castor wheels, respectively, are attached and/or wherein said left and right front bottom ends carry a footrest.

13. A support device for supporting a seat on an axle of a wheelchair, comprising an exchangeable intermediate element having a first end detachably fixed to a chassis of the seat and a second end detachably fixed to the axle, wherein the intermediate element can be selected according to preferences of a user of the wheelchair, the support device further comprising a center part rigidly and detachably attached to the axle, a pivot part pivotably fixed to the center part and having a pivot axis substantially parallel to the axle, and a fixing element suitable for fixing the support device to the chassis of the seat, wherein the intermediate element is situated between the pivot part and the fixing element.

14. The support device of claim 13, in which the intermediate part is rigid.

15. The support device of claim 13, further comprising a central boring extending from the pivot part through the intermediate element and to the fixing element, said boring housing a screw for fixably and detachably connecting said pivot part, intermediate element and fixing element.

16. The support device of claim 15, wherein the pivot part is pivotably seated in said center part through a pair of left and right pins extending in parallel to the axle, one end of each pin being lodged in left and right borings of the center part, respectively, an other end of each pin extending into a left and right boring of the pivot part, said pins thus providing a pivot axis for the pivot part.

17. The support device of claim 13, wherein the intermediate element comprises at least one elastic element.

18. The support device of claim 17, in which the intermediate element comprises a spring and/or a shock absorber element.

19. The support device of claim 13, wherein at least one washer is located between the intermediate element and the fixing element and/or between the intermediate element and the pivot part.

20. The support device of claim 13, wherein the center part is a one single piece element.

21. The support device of claim 20, wherein the center part further comprises two lodgings for attaching two frame elements.

22. A wheelchair comprising a seat and two main wheels connected by an axle and further comprising a support device for supporting the seat on the axle, said support device comprising an exchangeable intermediate element having a first end detachably fixed to a chassis of the seat and a second end detachably fixed to a center part attached to a middle part of said axle, said center part being arranged to receive rear ends of two left and right main frame elements of the wheelchair, wherein the intermediate element can be selected according to preferences of a user of the wheelchair , said support device further comprising a pivot part to be pivotally fixed to said center part, a pivoting axis of said pivot part being parallel to said axle, and a fixing element suitable for fixing the support device to the chassis of the seat, wherein the intermediate element is situated between the pivot part and the fixing element.

* * * * *

UNITED STATES PATENT AND TRADEMARK OFFICE

CERTIFICATE OF CORRECTION

PATENT NO. : 7,896,376 B2
APPLICATION NO. : 11/645479
DATED : March 1, 2011
INVENTOR(S) : Dauw et al.

It is certified that error appears in the above-identified patent and that said Letters Patent is hereby corrected as shown below:

On the title page item (73) Assignee:

The name of the Assignee should read as follows: "INVACARE CORPORATION"

Signed and Sealed this
Twenty-ninth Day of May, 2012

David J. Kappos

*Director of the United States Patent and Trademark Office*